US008073663B2

(12) United States Patent
Carruthers et al.

(10) Patent No.: US 8,073,663 B2
(45) Date of Patent: Dec. 6, 2011

(54) METHOD AND SYSTEM FOR MODELLING PETROLEUM MIGRATION

(75) Inventors: Dan Carruthers, Ottawa (CA); Christopher Neufeld, Ottawa (CA)

(73) Assignee: The Permedia Research Group Inc. (CA)

( * ) Notice: Subject to any disclaimer, the term of this patent is extended or adjusted under 35 U.S.C. 154(b) by 598 days.

(21) Appl. No.: 11/738,166

(22) Filed: Apr. 20, 2007

(65) Prior Publication Data

US 2008/0262809 A1 Oct. 23, 2008

(51) Int. Cl.
*G06G 7/48* (2006.01)
(52) U.S. Cl. .......................................... 703/10
(58) Field of Classification Search ...................... 703/10
See application file for complete search history.

(56) References Cited

U.S. PATENT DOCUMENTS

| | | | |
|---|---|---|---|
| 5,432,718 A | 7/1995 | Molvig et al. | |
| 5,586,082 A * | 12/1996 | Anderson et al. | 367/73 |
| 5,606,517 A | 2/1997 | Traub et al. | |
| 6,256,603 B1 | 7/2001 | Celniker | |
| 6,516,292 B2 | 2/2003 | Yahalom | |
| 6,611,736 B1 | 8/2003 | Waite et al. | |
| 6,711,529 B1 * | 3/2004 | Thore | 703/2 |
| 6,842,725 B1 | 1/2005 | Sarda | |
| 6,928,399 B1 * | 8/2005 | Watts et al. | 703/2 |
| 6,959,269 B1 | 10/2005 | Welterien | |
| 7,044,237 B2 * | 5/2006 | Leuchtenberg | 175/48 |
| 7,480,205 B2 * | 1/2009 | Wei | 367/37 |
| 7,840,394 B2 * | 11/2010 | Madatov et al. | 703/10 |
| 2002/0177986 A1 * | 11/2002 | Moeckel et al. | 703/9 |
| 2007/0043544 A1 * | 2/2007 | Song et al. | 703/9 |
| 2009/0129376 A1 * | 5/2009 | Johnson | 370/357 |

OTHER PUBLICATIONS

D.K. Khan, B.J. Rostron, Z. Margitai, D. Carruthers, "Hydrodynamics and petroleum migration in the Upper Ordovician Red River Formation of the Williston Basin", 2006, Journal of Geochemical Exploration 89, p. 179-182.*
Shanwen Zhang, Yongshi Wang, Dishi Shi, Huaimin Xu, Xiongqi Pang, Maowen Li, "Fault-fracture mesh petroleum plays in the Jiyang Superdepression of the Bohai Bay Basin, eastern China", 2004, Marine and Petroleum Geology 21, p. 651-668.*
A. Dodds, "Migrate2: a PC program for modelling the generation, migration and accumulation of hydrocarbons in four dimensions", Computers & Geosciences 26 (2000) 795-808.*
Neyval C. Reis Jr. João P. De Angeli, Alberto F. de Souza, Raul H. C. Lopes, "Petroleum Reservoir Simulation Using Finite Volume Method With Non-Structured Grids and Parallel Distributed Computing", 2001.*
Gilles Guerin, "Acoustic and Thermal Characterization of Oil Migration, Gas Hydrates Formulation and Silica Diagenesis", Thesis, Columbia University, 2000.* A. J. Queimada, "Interfacial tension, density, and viscosity of some petroleum distillation cuts; measurements and modeling with a new corresponding states model", Mercosur Congress, 2005.*
Thomas Hantschel, "Finite element analysis and ray tracing modeling of petroleum migration", Marine and Petroleum Geology 2000.*
F. Schneider, "A 3D Basin Model for Hydrocarbon Potential Evaluation; Application to Congo Offshore", Oil and Gas Science and Technoogy, 2000.*

* cited by examiner

*Primary Examiner* — David Silver
*Assistant Examiner* — Angel Calle
(74) *Attorney, Agent, or Firm* — Brooks Kushman P.C.

(57) ABSTRACT

A method for modelling the migration of reactant in a subsurface petroleum system is described. The method comprises in part generating a mesh for an area of the petroleum system. The mesh comprises a plurality of nodes, with each node representing a point in space in the area. The method also comprises calculating one or more variables representing one or more physical characteristics at each node in the area and determining the migration of reactant in the petroleum system based on the one or more variables. The method can also handle multiple reactant phases and non-static meshes.

6 Claims, 7 Drawing Sheets

METHOD AND SYSTEM FOR MODELLING PETROLEUM MIGRATION

FIELD OF THE INVENTION

The present invention relates generally to the fields of basin and reservoir simulation and the modelling of subsurface oil and gas flow.

BACKGROUND

Basin modelling is important for oil and gas exploration and production. One of the goals of basin modelling, and often associated reservoir filling studies, is to calculate the migration of non-aqueous reactants (most commonly petroleum, which may represent one or more chemical species) in subsurface deposits of complex geometry. To accomplish this goal, the system under study will usually be described by a grid system, with each cell of the grid being assigned petrophysical properties that describe how they will affect fluid flow. Where a three-dimensional model of a basin or reservoir, consisting of porous or fractured media, (hereafter collectively referred to as a "petroleum system") is being developed, a mesh of elements is imposed over the space under study. The mesh is usually (but not exclusively) made up of an orthogonal grid which may be cubic in shape. In an orthogonal grid, subsurface structures are represented by points in space in the x-y plane with a common value in the z plane. Each of these points in space is known as a node. If values are stored on the nodes, then values in between the nodes are commonly calculated by interpolation (although they may be held constant throughout the element, depending on the property). There can be millions of grid cells and associated nodes in a subsurface model. The usual technique of prior art systems has been to impose, and to populate the cells of this grid based on the element(s) that contribute most to the volume of each cell.

While this conventional approach captures many coarse features of the mesh, the grid can result in a model which is crude when compared the real world, incorporating considerable inherent elements of uncertainty. Such crudeness often distorts or destroys details that are important in determining the correct migration of reactants within the mesh. Thin features with high impedance to migration may be averaged out or omitted entirely in the conversion to the grid.

As a result, efforts have been made to provide grids which more closely approximate the features of a subsurface field under review. Several of such known methods used to simulate multi-phase petroleum flow are commonly described as Darcy flow, Flowpath and Invasion Percolation. All of these methods have been successfully applied and their strengths have been well documented, but all are also characterized by weaknesses which have limited their application and the quality of the results. For example, by imposing a regular grid and converting all internal inclined planes into horizontal planes in a staircase configuration, internal watersheds, natural directions of flow, are poorly approximated by such staircase structures, possibly resulting in migration pathways that are inconsistent with the underlying geometry.

SUMMARY OF THE INVENTION

In accordance with one embodiment, there is provided a method for modelling the migration of reactant in a subsurface petroleum system, the method comprising: generating a mesh for an area of said petroleum system, the mesh comprising a plurality of nodes, and each node representing a point in space in the area; calculating one or more variables representing one or more physical characteristics at each node in the area; determining the migration of reactant in the petroleum system based on the one or more variables.

In some embodiments, each node is not restricted to a common depth in the z domain.

In some embodiments, the mesh is comprised of a plurality of elements and each element is in one of a filled, a partially filled, or an unfilled state.

In some embodiments, the physical characteristics comprise one or more of fluid pressure, water fraction, oil fraction, and gas fraction.

In some embodiments, the one or more physical characteristics relate to a single-phase reactant.

In some embodiments, the one or more physical characteristics relate to a multi-phase reactant.

In some embodiments, the step of calculating one or more variables representing one or more physical characteristics at each node includes: calculating densities and interfacial tension ("IFT") for a node; computing back pressure for an element containing the node; computing capillary threshold pressure difference for the node; computing maximum depth of reactant below the node; and computing the minimum absolute depth of the node.

In another embodiment, there is provided a system comprising: a processor for generating a mesh for an area of a petroleum system, the mesh comprising a plurality of nodes, and each node representing a point in space in the area; a processor for calculating one or more variables representing one or more physical characteristics at each node in the area; and a processor for determining the migration of reactant in the petroleum system based on the one or more variables.

Other aspects and features of the present invention will become apparent, to those ordinarily skilled in the art, upon review of the following description of the specific embodiments of the invention.

BRIEF DESCRIPTION OF THE DRAWINGS

The invention will now be described in greater detail with reference to the accompanying diagrams, in which.

DETAILED DESCRIPTION OF THE PREFERRED EMBODIMENTS

Figure 1:
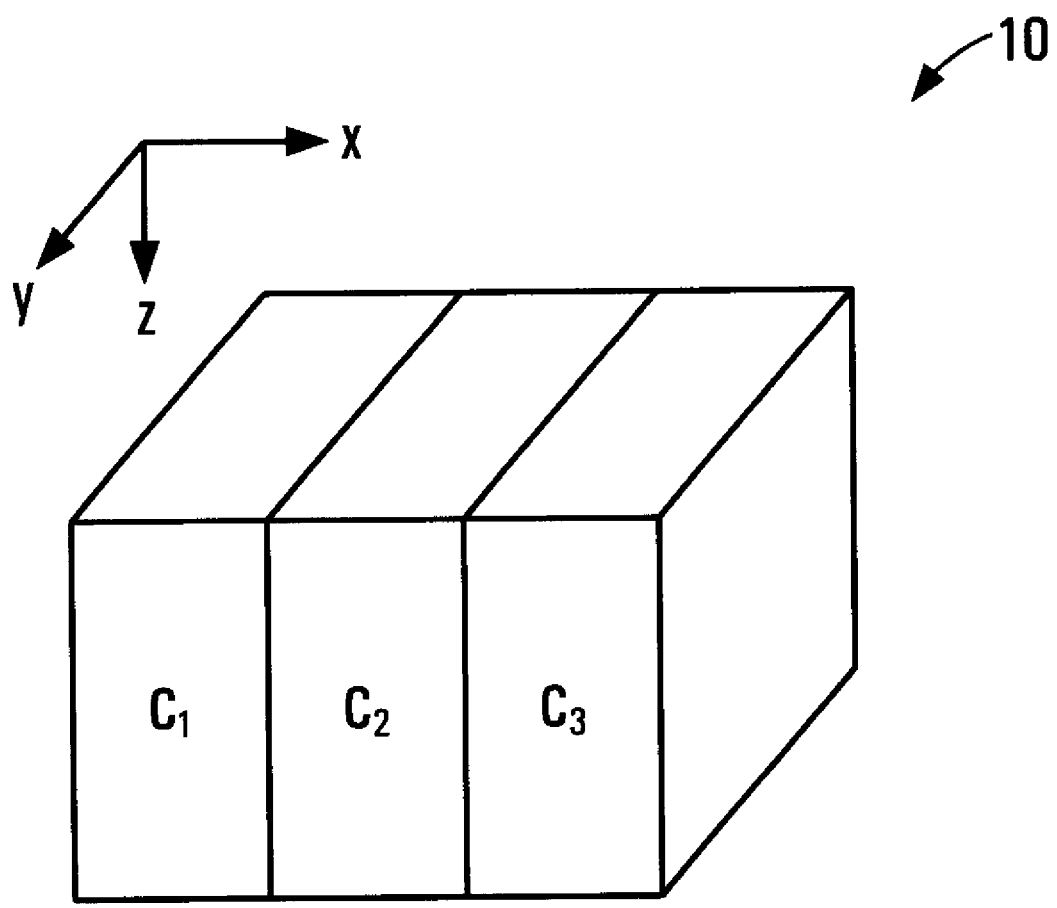
FIG. 1 is a perspective view of a three-dimensional orthogonal grid used to model petroleum systems in accordance with a conventional modelling technique.

FIG. 1 is a perspective view of a three-dimensional orthogonal grid 10 used to model subsurface structures in accordance with a conventional modelling technique. The use of a three-dimensional grid such as grid 10 is well known in the art of migration modelling. Grid 10 is made up of cells $C_1$, $C_2$ and $C_3$, though a typical grid used in prior art systems would be made up of hundreds if not millions of such cells. Each one of cells $C_1$, $C_2$ and $C_3$ is made up of one or more cell faces, some of which are hidden from view.

To accurately predict the flow of reactants, a model is built by imposing a grid such as grid 10 on to the petroleum system to facilitate the solution of flow equations by calculating the likelihood of reactant flow between the cells. The goal is to assemble a grid which represents a three-dimensional model of the petroleum system.

Variables are calculated for each cell which can include one or more of length, width, thickness, porosity, capillary threshold pressures, absolute permeabilities, elevation, temperatures, pressure(s), and others. In multiphase flow (i.e. oil, gas and water that may be in liquid or vapour states), a pressure for each phase is usually calculated. A petroleum systems model is usually built up by assigning such variables to a plurality of grids 10 over the subsurface structure of interest. This allows the model to characterize reactant flow through the reservoir.

However, simulation gridding technology using a grid such as that shown in FIG. 1 is lacking in its ability to accurately represent a real-world petroleum system.

In accordance with the modeling system and method described herein, reactant invasion (i.e. reactant from one element in a mesh to another) is modelled directly on any corner-point mesh that represents the subsurface area under study without resort to an externally-imposed grid of cubic cells such as that shown in FIG. 1. As a result, the controlling features of reactant migration are no longer cells or cell faces, but nodes (i.e. corners) of elements in the original mesh. Importantly, this technique allows for the partial filling of the elements, which decreases gridding effects on saturations and volumetrics. These corner-point meshes may be further sub-meshed for additional accuracy.

Figure 2:
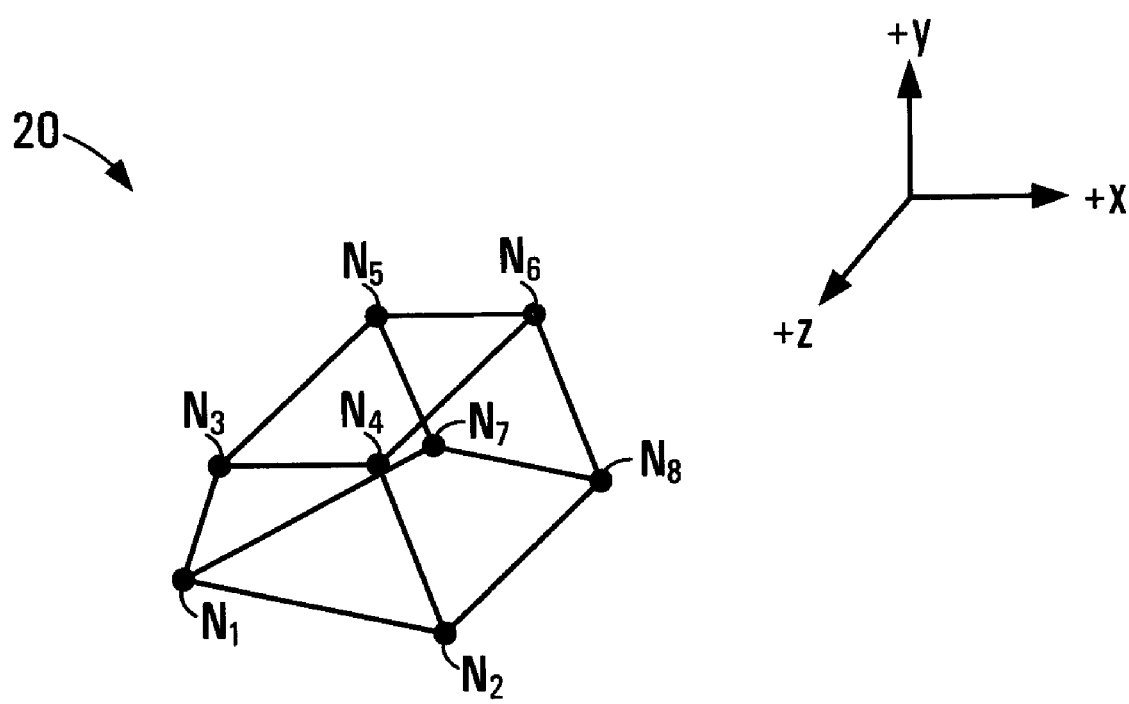
FIG. 2 is a perspective view of a mesh which can be used with the present invention.

FIG. 2 is a perspective view of mesh 20. Elements of mesh 20 are defined in terms of nodes $N_1, N_2, \ldots N_8$ that make up the corners of a polyhedral volume. For the sake of clarity, only one element is shown in mesh 20, though in practise a mesh would be made up of many elements. As compared to grid 10, FIG. 1, mesh 20 is not necessarily cubic in shape and therefore can more accurately be used to outline the features of a subsurface structure under review. As well, the controlling features of reactant migration are no longer calculated on the basis of cells or cell faces but instead nodes. Each node represents a point in three-dimensional space in the petroleum system under review. Nodes need not have common depth values ("z"), which are defined as the direction in which the buoyant force is exerted on reactants in the elements.

Some elements in a mesh, are defined as "source elements", act as sources of reactant. These elements accommodate as much of the reactant as they can hold and transfer the rest of it to neighbouring elements, which may in turn transfer the reactant onwards. A fluid body, or accumulation, begins as a single element containing at least some reactant. Sometimes, invading another element will add that element into the body. That is, under certain conditions, invasion of a target element will cause the element to be subsumed into the body which will now contain two or more elements. Thus, a body is a set of one or more elements treated together.

The set of nodes grows as the surface area of this set of elements increases, but the backfilling depth is always constrained by the one node which supports the shallowest absolute depth of filling.

Figure 3:
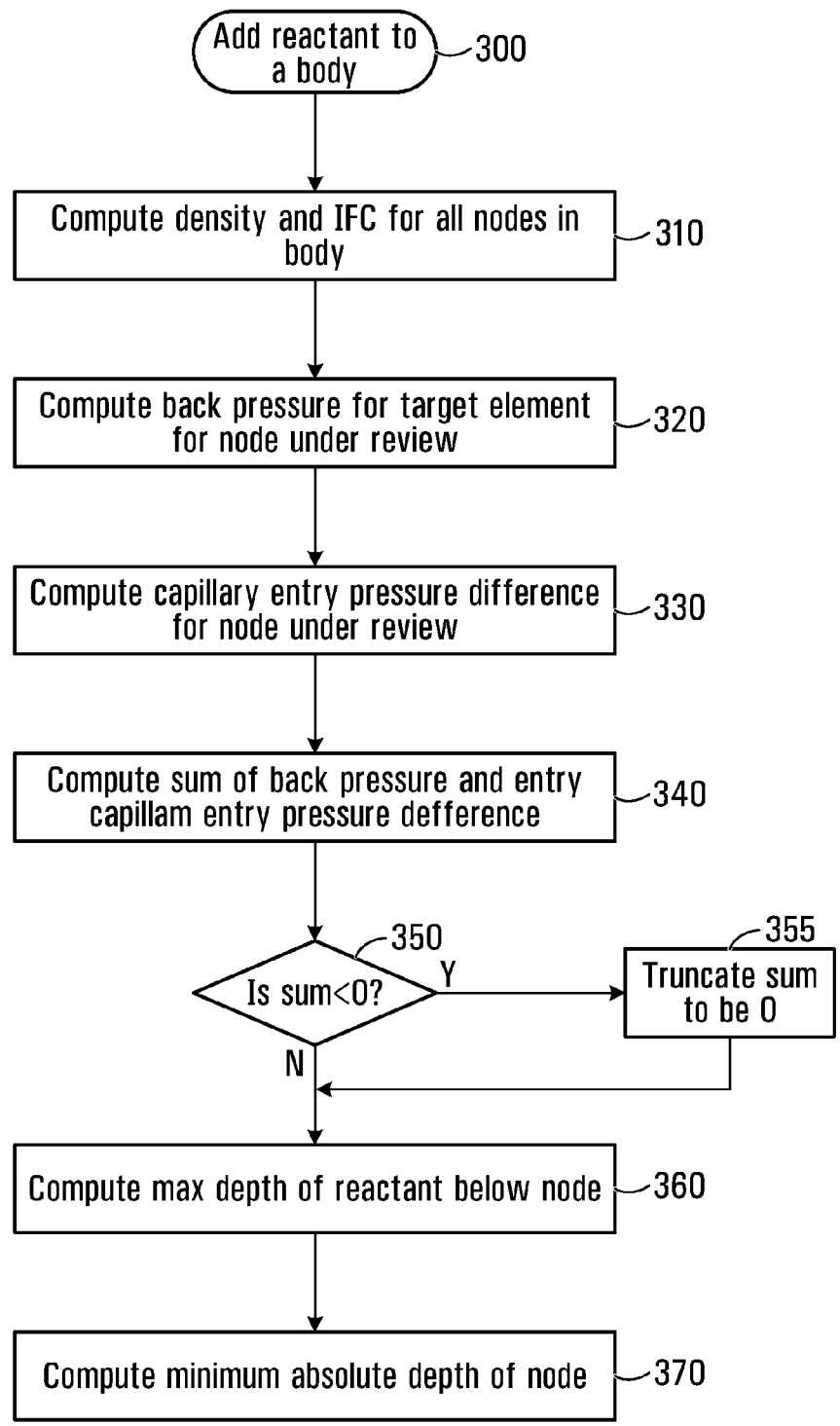
FIG. 3 is a flow chart of a method for calculating when a node in an element is under appropriate conditions to transfer reactant to a neighbouring element.

FIG. 3 is a flow chart of a method for calculating when a node in an element is under appropriate conditions to transfer reactant to a neighbouring element.

At step 300, reactant is added to a mesh element (an emergent fluid body). At given temperature and pressure values, the reactant present in a mesh element has specific values of density and an interfacial tension ("IFT") exists between it and other reactants (typically water). At step 310, densities and IFTs are computed for all nodes in a mesh element.

When considering whether reactant is to invade from a source element to a target element, two pressures are computed. The first is the back-pressure from the target element due to fluids (water and reactant) in that element. This back-pressure is equal to the excess hydrostatic pressure in the target plus the reactant pressure in the target element. This is calculated at step 320 for the node under review. The reactant pressure is defined as $$P_{node} = \int_{meniscus}^{node} G(\rho_{water} - \rho_{reactant}) dz \quad (1)$$

where 'G' is the gravitational acceleration in Newtons/kilogram, ρ is the density in kilograms/cubic meter, and 'z' is integrated in meters, to produce a pressure, 'P', in Newtons per square meter.

The second pressure contribution is the capillary threshold pressure difference, which is a function of IFT. This provides the amount of excess pressure required to force reactant into a formerly uninvaded element in the absence of any fluid-derived pressures. This is calculated at step 330 for the node under review. The capillary threshold difference is defined by the difference between the threshold pressure of the element the reactant is moving from and the threshold pressure of the element that the reactant is (potentially) moving into.

The sum of these two pressures, which is calculated at every node in the element under review, allows a computation of the maximum pressure that can be exerted by reactant at that node before the reactant is forced into the target element touching at that node. This sum is calculated at step 340.

At step 350, a determination is made as to whether the maximum pressure is negative. If so, the maximum pressure is truncated at zero at step 355. From this maximum pressure and Equation 1 above, a maximum depth of reactant below the node is calculated at step 360. This can be described using Equation 2:

$$z = \frac{P_{breach}}{G(\rho_{water} - \rho_{reactant})} \quad (2)$$

where P_breach is the pressure required to breach at the node, in Newtons per square meter, 'G' is the gravitational constant in Newtons per kilogram, and the ρ values are densities in kilograms per cubic meter. The resulting value of 'z' is supplied in meters.

Knowledge of the depth of the node allows a computation at step 370 of a minimum absolute depth for the node under review. The shallowest of these absolute depths, as computed at all nodes, and provides the maximum filling depth that can be supported by the element under review. Any additional reactant that would fill the element below this depth is, instead, drained out into a target element, as at least one node becomes "leaky" once this depth is exceeded.

The above described method is only one example for calculating when a node in an element is under appropriate conditions to transfer reactant to a neighbouring element. One skilled in the art would appreciate that other methods may also be used without departing from the scope of the invention.

For example, all IFT values could be approximated as constant throughout the system (or constant per phase), which greatly simplifies the internal implementation, entirely eliminating a heavy data structure.

The system could be further simplified by binning node 'z' values in discrete increments. This moves half-way to the prior art cubic array-based system, and would be a reasonable approximation in some instances while still maintaining most of the desired behavior, at least on elements that have more than a small slope. That could simplify and speed up calculations, and still constitute an improvement over the use of a cubic array as shown in FIG. 1.

Alternatively, a mathematical equivalence could be obtained by maintaining net pressures within elements. That is, rather than a delta-Pth, one could assign each element an entry pressure which is the sum of water, Pth, and reactant pressures. Mathematically equivalent, but now the concepts would be looking at the difference between elements of a certain scalar field, rather than a delta across nodes. Migration pathways would tend to follow the gradient of this scalar field. Local minima would be infilled, and the pathways would be calculated out to the edges of the mesh.

A Monte-Carlo system is also possible that involves computing the probability of a given node being chosen for expulsion, based on a Boltzmann process and an energy function which depends on depth of the node and the back-pressures from adjacent nodes. In this case, the decision is made deterministically, i.e. the minimum-value node is always the one that expels, but a probabilistic approach could also be used, particularly if random variation is not used to condition the rock properties. Such a probabilistic approach would favour the highest node, but would not necessarily expel from the node with the lowest energy.

Expulsion from nodes is discussed herein because meshes used in accordance with the present invention may have shared nodes between elements, but the general location from which reactant is expelled can be "the point of highest contact between the elements for the given phase".

Invasion from a source element to a target element can only proceed from nodes that lie within the volume that contains reactant. If the higher nodes in an element cannot support enough depth to allow the element to fill to a lower node, then there will be no invasion from the lower node. This constraint allows elements to be internally partially backfilled, and causes the migration of reactant to favour natural upward flow along inclined elements because, all other conditions being equal, the highest node in the element will have the highest pressure of reactant.

Figure 4:
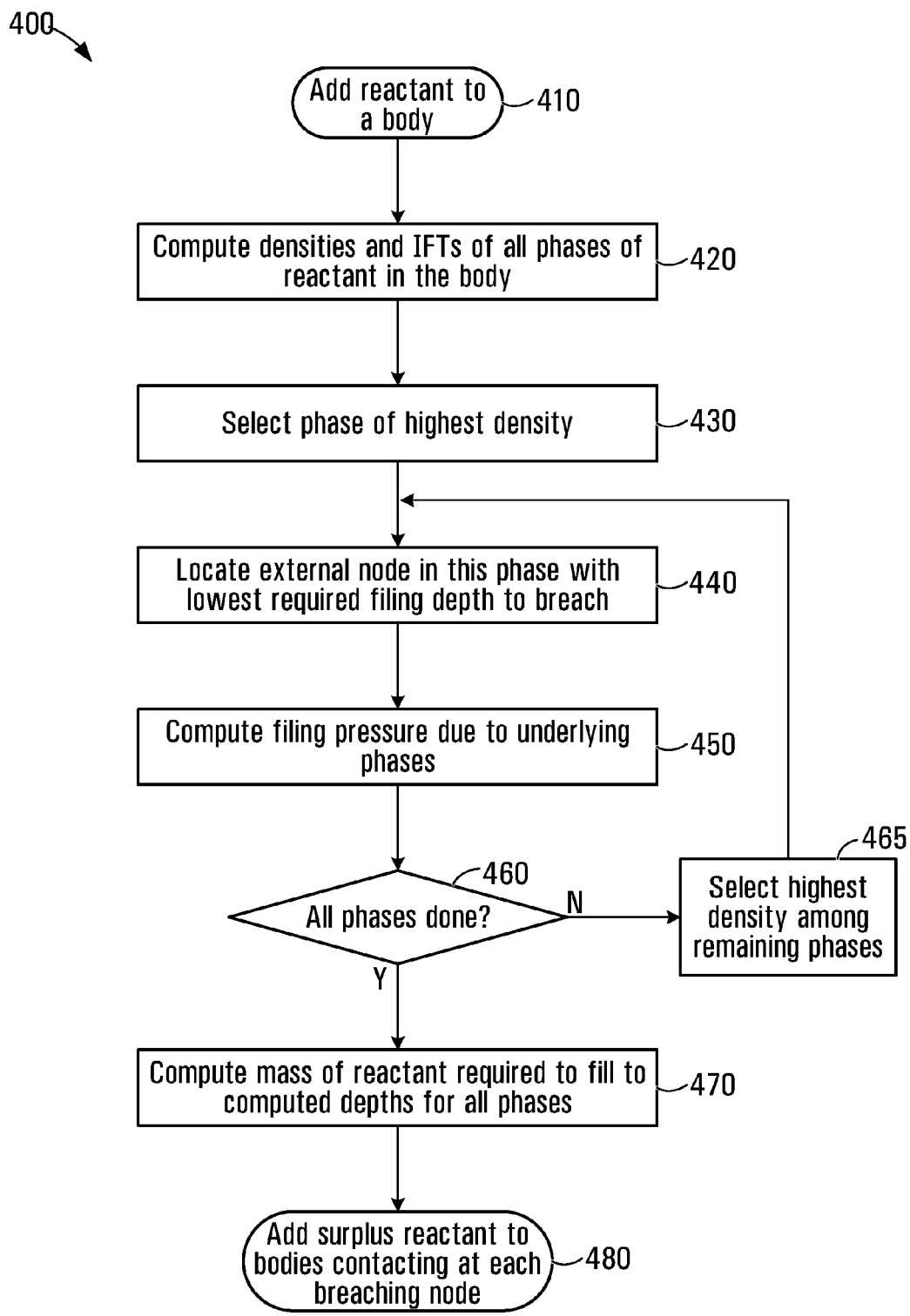
FIG. 4 is a flow chart of a method for calculating when a node in an element is under appropriate conditions to will transfer reactant to a neighbouring element where there are multiple reactant phases.

In another embodiment, the method described in FIG. 3 can be extended to multiple reactant phases. This is shown in FIG. 4 which is a flow chart of a method for calculating when a node in an element is under appropriate conditions to will transfer reactant to a neighbouring element where there are multiple reactant phases.

In this embodiment, the phase-separation menisci are recorded in each body. A given phase in a given element is only capable of invading neighbouring elements through a node that contacts that phase. If there are no nodes in contact, or if there is insufficient pressure to force reactant through any of the nodes that are in contact, then the body has not yet reached an equilibrium condition, and one or more phases will be allowed to change significantly in volume as the trapped phase tends to displace the phase(s) capable of invasion into neighbouring volumes. Once an equilibrium state is reached, the menisci move only in response to fluctuations in the density and IFT of the reactant as different chemical constituents are introduced to the body over time.

At step 410, reactant is added to a body. At step 420, densities and IFTs are computed for all phases of reactant in the body. At step 430, the phase of highest density is selected. At step 440, the external node in the selected phase with the lowest required filling depth to breach is located. At step 450, a computation is made of the filling depth including pressure due to underlying phases. At step 460, an evaluation is made as to whether all phases have been completed. If no, then at step 465, the highest density among the remaining phases is selected, and the method is returned again to step 440. FIG. 3 basically describes in detail the steps involved in steps 440 and 450 of FIG. 4.

Once an analysis of all the phases is done, a computation is made of the mass of reactant required to fill the element to computed depths for all phases. At step 480, surplus reactant is added to bodies contacting at each breaching node.

In another embodiment, reactant migration is modeled on the basis of an evolving mesh. In this embodiment, reactant migration is performed on an unchanging mesh for the lifetime of that mesh, and then a new mesh is applied to the reactant in the system. Several important changes are possible as the mesh is updated: (i) One or more elements that were present in the old mesh may be absent in the new mesh, having been "pinched out". The reactant that was present in these elements should, whenever possible, be recovered and permitted to continue migration; (ii) Due to changes in porosity or water saturation, the volume of reactant that can be held by a given element may change. A body may contain more reactant than can be accommodated by all the elements in the body; (iii) Due to changes in temperature and pressure as rock elements are raised or lowered, the density (and hence volume) and IFT of reactant in an element may change. Any such change will change the total mass of reactant that can be supported within the element or the body; (iv) Due to changes in capillary entry pressure of rock elements, the threshold pressure required to invade neighbouring elements may change; (v) Due to changes in the hydrostatic pressure environment in the subsurface, the fluid-derived pressures at a node may change; and (vi) The geometries of elements that are conjoined into a body may change sufficiently that, at the maximum supported depth of filling of the body, the elements no longer form a continuous set. This is shown in FIGS. 5A-5C described below.

Figure 5A:
FIGS. 5A and 5B are illustrations of modeled fluid bodies whose elements are continuous.
Figure 5B:
Figure 5C:
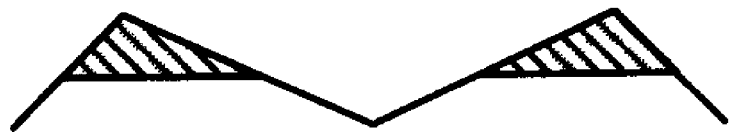
FIG. 5C is an illustration of a modeled fluid body whose elements no longer form a continuous set.

FIGS. 5A and 5B are illustration of modeled fluid bodies whose elements are continuous in nature with each other. By contrast, FIG. 5C is an illustration of a modeled fluid body whose elements no longer form a continuous set. It is preferred if all elements of modeled fluid bodes used in accordance with the present invention be continuous, as shown in FIGS. 5A and 5B.

Figure 6:
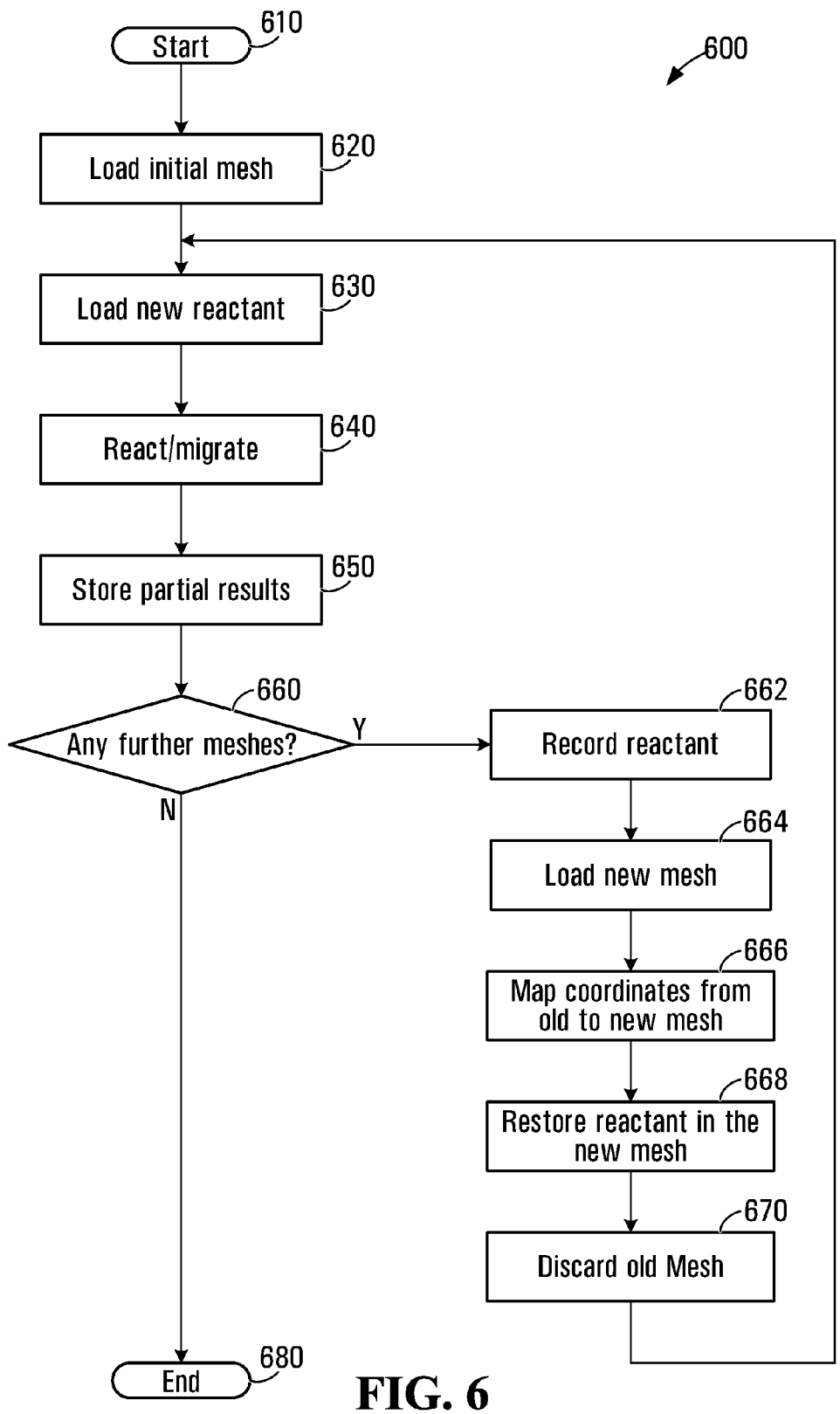
FIG. 6 is a flow chart of a method to transition a body to a new mesh.

It is important that the model respond correctly in the face of the changes mentioned above. FIG. 6 is a flow chart 600 of a method to transition a body to a new mesh. At step 610, the method is started. At step 620, the initial mesh is loaded. At step 630, a new reactant is loaded. At step 640, computations are performed for the migration of reactants. See FIG. 3 for further details regarding step 640. Partial results are then stored at step 650.

At step 660, an analysis is performed regarding there are any additional meshes. If no, the method ends at step 680.

If there are additional meshes, the reactant contained in the body is recorded at step 662 and a new mesh is loaded at step 664. At step 666, a subset of the elements in the body is computed. This consists of all elements in the bodies which exist in the new mesh and for which there are no other elements from the body lying directly below them. This, therefore, is the floor of the body. This ensures that pinched-out elements are excluded from the set, but the reactant that was contained in those elements is not lost.

At step 668, the reactant in the body is reinjected into each element in the floor of the body in an amount proportional to their fractional contribution to the total area of the body in the X-Y plane. This reactant is exposed to new temperature and pressure conditions, and allowed to migrate and invade neighbouring elements as appropriate. As the invasion proceeds and new fluid bodies are formed, the bodies are permitted to merge into larger fluid bodies when the geometry and rock properties allow. If a body consists only of a single element, and that element is pinched out, the reactant formerly held by that body is discarded.

At step 670, the old mesh is discarded and the method resumes again at step 630.

The above described method is only one example for dealing with a new mesh. One skilled in the art would appreciate that other methods may also be used without departing from the scope of the invention.

For example, all the elements that were previously in the body could be taken and used to form a new body, giving them the reactant that they had on the previous mesh. This is not ideal because it amounts to preserving the bodies across mesh steps, and can create serious data inconsistencies when the geometry of the mesh changes significantly.

Material could be injected into the elements on a per-element basis, rather than into the floor of the bodies. While this may be a more fair system, it is also not ideal because it could produce some undesirable artifacts for bodies that receive no new reactant during the new mesh step and/or bodies whose pore volume increases from one step to the next.

Note that, in implementation of FIG. 6, many bodies are often only one element thick in the Z-direction, which means that the two approaches (i.e. injecting at the floor of the bodies, versus injecting into each element) are, in fact, equivalent. The implementation shown in FIG. 6 is preferred when it is possible to employ.

Figure 7:
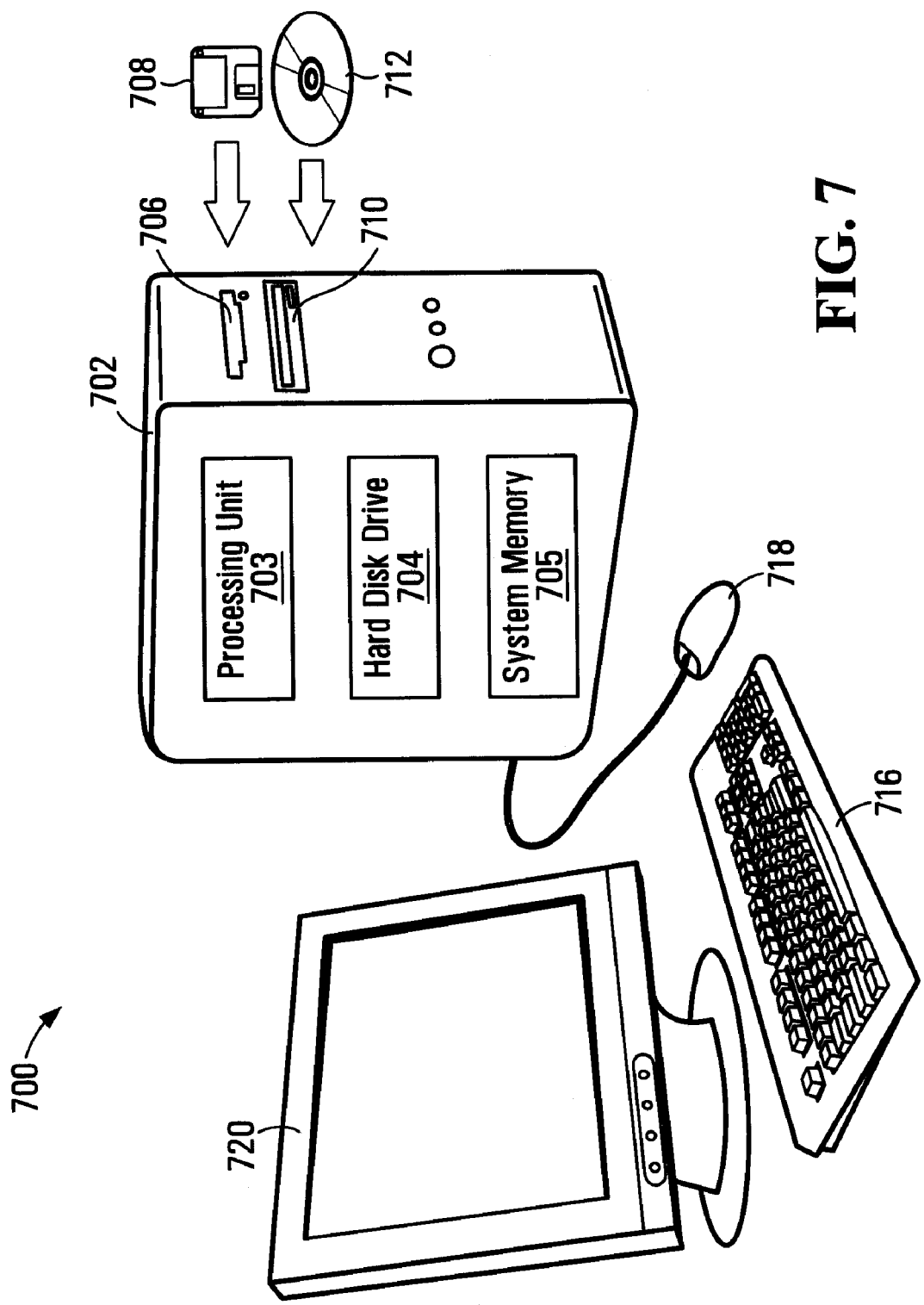
FIG. 7 is a schematic diagram of a conventional personal computer which can be used to run software programs embodying the methods of the present invention.

As shown in FIG. 7, an exemplary system 700 for implementing the invention includes a general purpose computing device 702 in the form of a conventional personal computer or the like, including a processing unit 703, and a system memory 705. The personal computer 702 may further include a hard disk drive 704, a magnetic disk drive 706 for reading from or writing to a removable magnetic disk 708, and an optical disk drive 710 for reading from or writing to a removable optical disk 712 such as a CD-ROM or other optical media. The drives and their associated computer-readable media provide non-volatile storage of computer readable instructions, data structures, program modules and other data for the personal computer. Other types of computer readable media which can store data that is accessible by a computer can also be used.

A user may enter commands and information into the personal computer through input devices such as a keyboard 716 or a pointing device 718. A monitor 720 or other type of display device is also connected to personal computer 702. Personal computer 702 may operate in a networked environment using logical connections to one or more remote computers.

A user can use computer software running on personal computer 702 to utilize the modeling methods described above.

What has been described is merely illustrative of the application of the principles of the invention. Other arrangements and methods can be implemented by those skilled in the art without departing from the spirit and scope of the present invention.

The invention claimed is:

1. A non-transient computer-readable medium storing instructions for performing a method for modeling the migration of reactant in a subsurface petroleum system, the method comprising:
    generating a mesh for a region of said petroleum system, the mesh comprising a plurality of elements, each element representing an enclosed volume and comprising a plurality of nodes, and each node representing a point in space in the region;
    calculating one or more variables representing one or more physical characteristics at each node in the region; and
    determining the migration of reactant in the petroleum system based on the one or more variables,
        wherein
            at least some of the nodes of the plurality of nodes are not spaced according to a three-dimensional orthogonal grid;
            the step of calculating one or more variables representing one or more physical characteristics at each node comprises at least:
                calculating densities and interfacial tension ("IFT") for a node;
                computing back pressure for an element containing the node;
                computing capillary threshold pressure difference for the node; and
                computing maximum depth of reactant below the node;
        and wherein the back-pressure for an element is equal to the excess hydrostatic pressure in the element plus the reactant pressure in the element, where the reactant pressure in an element under review is calculated at each node of said element under review by:

$$P_{node} = \int_{meniscus}^{node} G(\rho_{water} - \rho_{reactant}) dz$$

where 'G' is the gravitational acceleration in Newton's/kilogram, $\rho_{water}$ is the density of water and $\rho_{reactant}$ is the density of reactant in kilograms/cubic meter, and 'z' is integrated in meters between the depth of a water to reactant meniscus and the node depth.

2. The computer-readable medium of claim 1, wherein each element is in one of a filled, a partially filled, or an unfilled state.

3. The computer-readable medium of claim 1, wherein the one or more physical characteristics relate to a single-phase reactant.

4. The computer-readable medium of claim 1, wherein the one or more physical characteristics relate to a multi-phase reactant.

5. A non-transient computer-readable medium storing instructions for performing a method for modeling the migration of reactant in a subsurface petroleum system, the method comprising:
   generating a mesh for a region of said petroleum system, the mesh comprising a plurality of elements, each element representing an enclosed volume and comprising a plurality of nodes, and each node representing a point in space in the region;
   calculating one or more variables representing one or more physical characteristics at each node in the region; and
   determining the migration of reactant in the petroleum system based on the one or more variables,
      wherein
         at least some of the nodes of the plurality of nodes are not spaced according to a regular three-dimensional orthogonal grid;
         the step of calculating one or more variables representing one or more physical characteristics at each node comprises at least:
            calculating densities and interfacial tension ("IFI") for a node;
            computing back pressure for an element containing the node;
            computing capillary threshold pressure difference for the node; and
            computing maximum depth of reactant below the node;
         and wherein the maximum depth of reactant below the node is defined as $$z = \frac{P_{breach}}{G(\rho_{water} - \rho_{reactant})},$$

where $P_{breach}$ is the pressure required to breach at the node, in Newton's per square meter, 'G' is the gravitational constant in Newton's per kilogram, and $\rho_{water}$ is the density of water and $\rho_{reactant}$ is the density of reactant in kilograms per cubic meter.

6. The computer-readable medium of claim 5, wherein $P_{breach}$ is calculated as the sum of the capillary threshold pressure difference for the node and the back pressure for an element containing the node.

* * * * *

UNITED STATES PATENT AND TRADEMARK OFFICE
CERTIFICATE OF CORRECTION

PATENT NO. : 8,073,663 B2  Page 1 of 1
APPLICATION NO. : 11/738166
DATED : December 6, 2011
INVENTOR(S) : Dan Carruthers et al.

It is certified that error appears in the above-identified patent and that said Letters Patent is hereby corrected as shown below:

In the Claims

Column 8, Line 35:
After "tension" delete "("IFI")" and insert -- ("IFT") --.

Column 8, Line 54:
After "acceleration in" delete "Newton's/" and insert -- Newtons/ --.

Column 9, Line 16:
After "to a" delete "regular".

Column 9, Line 21:
After "'tension" delete "("IFI")" and insert -- ("IFT") --.

Column 10, Line 13:
After "in" delete "Newton's" and insert -- Newtons --.

Signed and Sealed this
Twenty-fourth Day of September, 2013

Teresa Stanek Rea
*Deputy Director of the United States Patent and Trademark Office*